(12) United States Patent
Ross

(10) Patent No.: US 8,453,032 B2
(45) Date of Patent: May 28, 2013

(54) ENERGY AND SPACE EFFICIENT DETECTION FOR DATA STORAGE

(75) Inventor: John Anderson Fergus Ross, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 12/764,765

(22) Filed: Apr. 21, 2010

(65) Prior Publication Data
US 2011/0264975 A1  Oct. 27, 2011

(51) Int. Cl.
*H03M 13/00* (2006.01)
(52) U.S. Cl.
USPC ............... 714/758; 714/48; 714/49; 714/799
(58) Field of Classification Search
USPC ...................... 714/48, 49, 758, 799
See application file for complete search history.

(56) References Cited

U.S. PATENT DOCUMENTS

| | | | |
|---|---|---|---|
| 6,412,089 B1 | 6/2002 | Lenny | |
| 6,446,234 B1 * | 9/2002 | Cox et al. ................ | 714/758 |
| 6,687,791 B2 * | 2/2004 | Morrison ................ | 711/130 |
| 6,931,576 B2 * | 8/2005 | Morrison et al. ............ | 714/54 |
| 7,694,208 B2 * | 4/2010 | Ball .................. | 714/784 |
| 7,730,344 B1 * | 6/2010 | Perozo ................ | 714/6.13 |
| 7,827,467 B2 * | 11/2010 | Wenger et al. ............ | 714/758 |
| 2003/0131291 A1 * | 7/2003 | Morrison et al. ............ | 714/54 |
| 2005/0055621 A1 * | 3/2005 | Adelmann et al. ............ | 714/758 |
| 2007/0157070 A1 * | 7/2007 | Wenger et al. ............ | 714/807 |
| 2007/0260758 A1 * | 11/2007 | Yen .................. | 710/5 |
| 2011/0107325 A1 * | 5/2011 | Matthew et al. ............ | 717/174 |

FOREIGN PATENT DOCUMENTS

| | | |
|---|---|---|
| EP | 1801983 A1 | 6/2007 |
| WO | 2004/107338 A1 | 12/2004 |

OTHER PUBLICATIONS

Krishna R Narayanan et al: "A Novel ARQ Technique using the Turbo Coding Principle", IEEE Communications Letters, IEEE Service Center, Piscataway, NJ, US, vol. 1, No. 2, (Mar. 1, 1997),XP011010498.

EP Search Report issued in connection with corresponding EP Patent Application No. 11162301.3 filed on Apr. 13, 2011.

* cited by examiner

*Primary Examiner* — Charles Ehne
(74) *Attorney, Agent, or Firm* — Jean Testa; Fletcher Yoder

(57) ABSTRACT

Provided are methods and systems of selectively decoding optical data read from an optical storage medium based on a checksum algorithm technique. In one embodiment, optical data is converted into a data stream and buffered, and the checksum algorithm is applied to the data stream. If the calculated checksum matches an encoded checksum of the data stream, the data stream may be output without requiring further decoding. If the calculated checksum does not match the encoded checksum, the buffered data stream may be decoded to produce a corrected data stream, and the checksum algorithm may be applied to the corrected data stream. In some embodiments, the optical data may be re-read if the corrected data stream does not pass the checksum test, and the data stream obtained from the re-reading may be combined with the buffered data stream for further decoding.

20 Claims, 3 Drawing Sheets

ENERGY AND SPACE EFFICIENT DETECTION FOR DATA STORAGE

BACKGROUND

The subject matter disclosed herein relates to optical storage, and more particularly, to techniques for decoding data in optical storage systems.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disk, developed in the early 1980s, has a capacity of around 650-700 MB of data, or around 74-80 min. of a two channel audio program. In comparison, the digital versatile disk (DVD) format, developed in the early 1990s, has a capacity of around 4.7 GB (single layer) or 8.5 GB (dual layer). Furthermore, even higher capacity storage techniques have been developed to meet higher demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. For example, holographic storage systems and micro-holographic storage systems are examples of other developing storage technologies that may achieve increased capacity requirements in the storage industry.

Along with increases in data capacity, high data rates are also desired. For example, the video bit rate for a standard DVD format may be about 9.8 Mbps, and the video bit rate for a standard Blu-ray Disc™ format may be about 40.0 Mbps. Further data rate increases may also be expected as higher capacity storage systems are developed. To support such high rates of data processing, a high amount of energy may be used for the numerous calculations and steps involved in typical channel decoding procedures. For example, an efficient Reed-Solomon decoder may operate at 1 Gbps and may consume approximately 200 mW/s. Complex soft-decision decoding may consume significantly more power.

Complex decoding processes used in optical storage systems may utilize a significant amount of energy and result in an accumulation of heat, which may result in a need for internal and/or external cooling. Such cooling methods may be undesirable due to unacceptable long-term failure rates. Thus, efficient data decoding processes may be desirable.

BRIEF DESCRIPTION

In one embodiment, an optical reader system is provided. The system includes optical reading circuitry configured to produce a data stream based on an optical data reading from an optical medium. The system also includes checksum circuitry configured to apply a checksum test to the data stream and a processor configured to determine whether the data stream passes the checksum test. Further, the system includes a decoder configured to be deactivated when the processor determines that the data stream passes the checksum test, and configured to be activated when the processor determines that the data stream fails the checksum test.

Another embodiment provides a method including reading a data block from a storage medium, generating a bit-stream based on the data block, buffering the bit-stream, applying a checksum test to the bit-stream, and deactivating a decoder if the bit-stream passes the checksum test.

In yet another embodiment, a method of decoding for a multiple-channel optical reader is provided. The method includes reading multiple data blocks from multiple optical data channels, generating multiple data streams based on the multiple data blocks, and performing a checksum test on each of the multiple data streams. Further, the method includes utilizing a common decoder for each of the multiple data streams.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
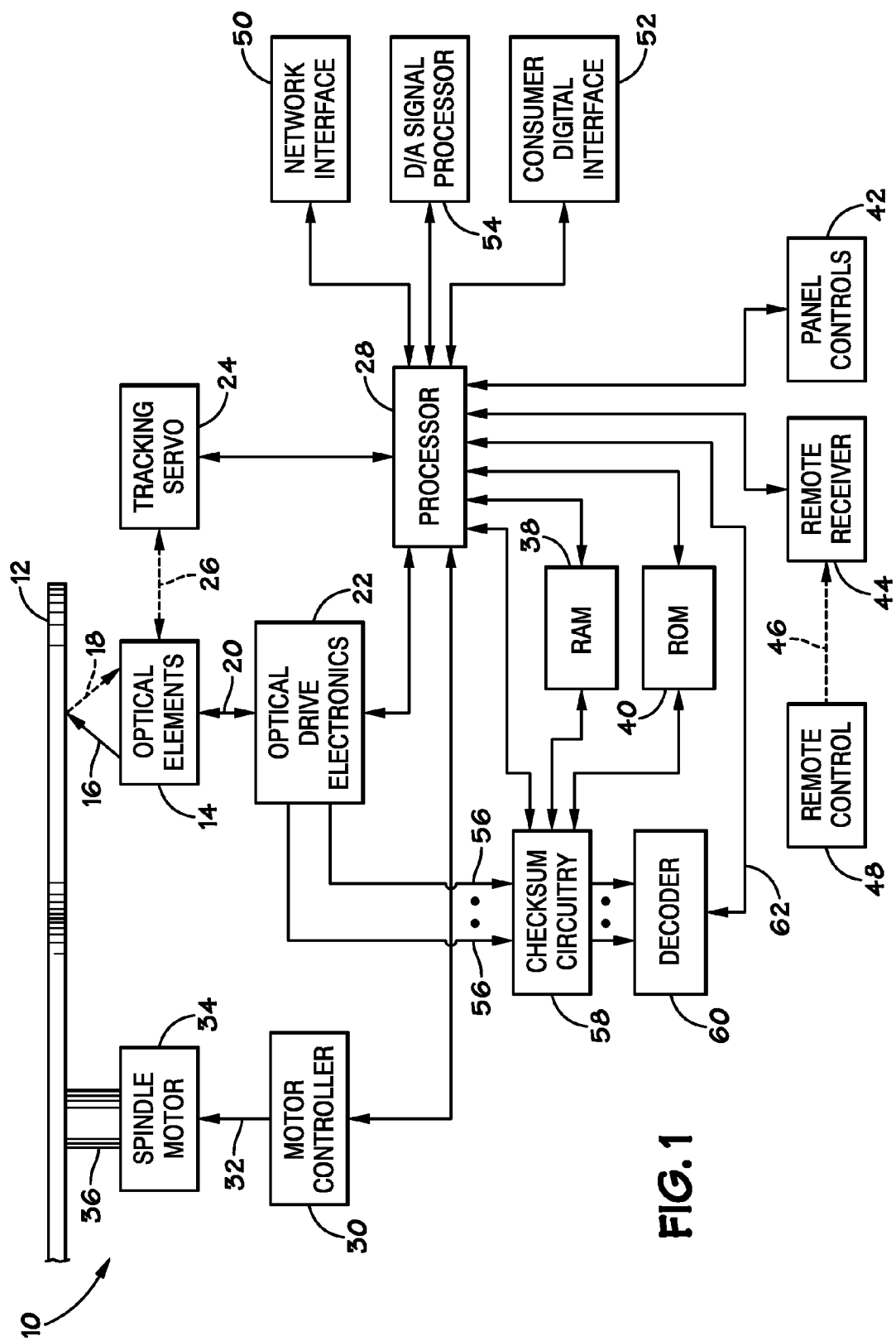
FIG. 1 is a block diagram depicting an optical reader system, in accordance with an embodiment.

In certain storage systems, such as optical storage systems, a data writing process may typically include read-after-write (RAW) verification to verify that the data written to the medium may be accurately recovered. RAW verification may generally involve writing data to a medium, and immediately reading and checking the read data to verify that the data was written correctly. For example, in some systems, data may be encoded in blocks as it is written onto a medium. An unencoded data block corresponding to the encoded written block may be saved. The encoded data block may then be read back and decoded, and the decoded read data may be compared with the saved unencoded data. If the data blocks match, then the written data may be accurate, and the writing process may continue for subsequent blocks of data. If the data blocks do not match, then RAW verification may fail, and the data block may be rewritten (e.g., elsewhere on the medium). Thus, as RAW verifies the accuracy of data during the writing process, data that has passed RAW verification generally has a high probability of being correct.

In typical storage systems, a process for reading stored data may typically include decoding the read data. For example, data may be read from a medium and converted into a bit-stream. The bit stream may then be decoded to remove any redundant bits which may correspond to a number of different error correction codes (ECC), including, for example, Reed-Solomon encoding, feed-forward systematic codes, recursive systematic codes, Viterbi codes, bit-error rate minimizing codes, etc. The redundant bits may then be used to correct errors which may have occurred during the reading process. Such decoding processes often take a high amount of energy. For example, a Reed-Solomon decoder operating at 1 Gbps may consume approximately 200 mW, and certain types of soft-decision decoding may consume even more energy. Storage systems using multi-channel reading processes may use even more energy and may also require additional circuitry, as a decoder may be constantly decoding as each channel is read. The high amount of energy used to operate the typical decoding schemes may result in an accumulation of heat. While some systems address heat accumulation by installing internal or external cooling, such methods increase system complexity and may have undesirable long-term failure rates.

Thus, typical decoding processes for reading stored data may use high energy, increase heat accumulation, and increase system design complexity to implement parallel decoders and/or cooling mechanisms. However, the typical decoding approach of always decoding while reading may not always be efficient. In particular, when reading data that has been recorded using RAW verification, further decoding or error correction may not always be useful or necessary due to the high probability that RAW verified data is already correct. In other words, since RAW verified data is usually correct, the default process of decoding read data may be inefficient. One or more embodiments disclosed herein provide methods and systems for reducing energy consumption and system complexity by performing a checksum algorithm and selectively decoding read data based on the checksum results.

Turning now to the figures, FIG. 1 is a block diagram providing one example of a storage system reader which may implement an embodiment of the selective decoding techniques. While the particular reader system illustrated in FIG. 1 is an optical reader system 10, it should be noted that other types of storage system readers may also implement the present techniques. The optical reader system 10 may be used to read data from storage medium such as optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The reflected beam 18 may include some combination of light reflected from a micro-hologram on the optical storage disc 12, light reflected from a surface of the optical storage disc 12, and some interaction of the light reflected from the micro-hologram and the light reflected from the surface. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

In some embodiments, once optical data from the optical data disc 12 is received at the optical elements 14 in the form of the reflected beam 18 and converted into a bit-stream by the optical drive electronics package 22, the optical drive electronics 22 may transmit a bit-stream (e.g., the digitized data stream corresponding to the reflected beam 18) to checksum circuitry 58. The checksum circuitry 58 may be included in or coupled to the optical drive electronics 22. In embodiments where more than one channel (e.g., more than one data track on an optical disk) of data is concurrently read, the optical drive electronics 22 may transmit several bit-streams from different channels through one or more bit lines 56. The checksum circuitry 58 may check the accuracy of each bit stream by applying a checksum algorithm to compute a checksum and check the computed checksum with the originally embedded checksum. Data which passes a checksum test of the checksum circuitry 58 may be determined to be accurate and may be output. The processor 28 may control the operation of the checksum circuitry 58, the output of data, and/or the treatment of data resulting in checksum failures.

The checksum circuitry 58 may be coupled to a decoder 60, which may include circuitry for decoding a bit-stream from the checksum circuitry 58 to remove redundant bits and/or correct errors which may have occurred during the reading process. In some embodiments, the decoder 60 may have to be deactivated or activated via a control signal 62 from the processor 28. For example, the decoder 60 may remain deactivated until the checksum circuitry 58 determines that a checksum failure has occurred. The processor 28 may send a control signal 62 to activate the decoder 60.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 may also include data for controlling the decoder 60 and programs that allow the processor 28 to analyze data from the optical drive electronics 22 which has been stored in the RAM 38 (e.g., buffered data streams), among others. In some embodiments, the decoder 60 may also include memory for storing algorithms (e.g., the checksum algorithm and/or a decoding algorithm). As discussed in further detail herein, such analysis of the data stored in the RAM 38 may include, for example, verifying the accuracy of read data (e.g., a checksum algorithm), decoding, or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
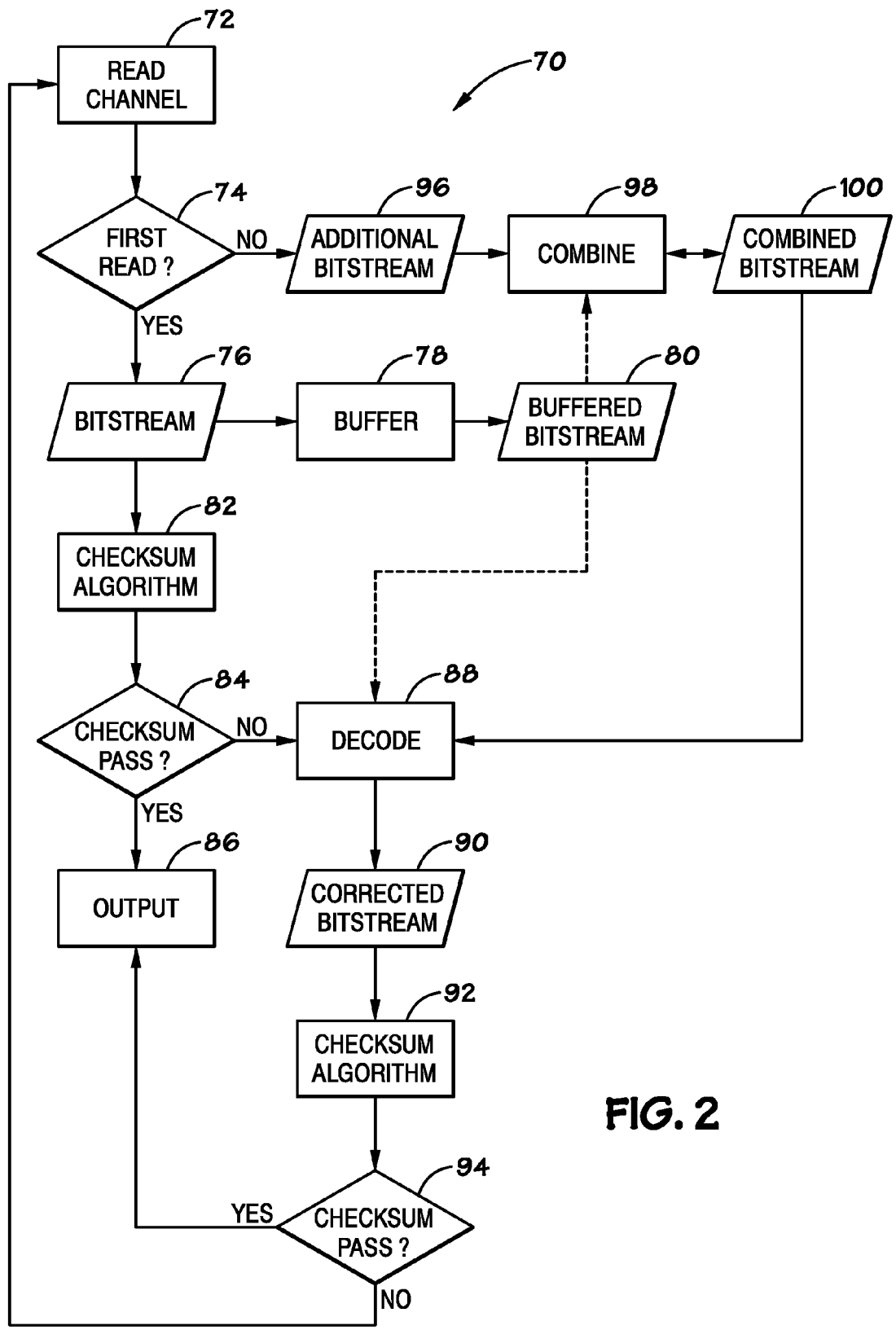
FIG. 2 is a flow chart illustrating a process for efficient decoding using a checksum algorithm, in accordance with an embodiment.

A flow chart illustrating a process for a selective decoding scheme using a checksum algorithm is provided in FIG. 2. The process 70 may begin with reading (block 72) a block of data from a channel of a storage media. For example, referring back to FIG. 1, the process may begin with an optical reader system 10 transmitting a read beam 16 and receiving a reflected beam 18 at optical elements 14. The data of the reflected beam 18 may be processed to generate a bit-stream 76. It should be noted that the process 70 may include repeated reading iterations. The process of determining the read iteration number (e.g., the first read decision block 74) will be described in detail below. Further, the bit-stream 76 may be buffered (block 78) and stored in a memory component (e.g., the RAM 38 of FIG. 1) as the buffered bit-stream 80, which may be accessed if a read error is detected.

Applying the checksum test (block 82) may refer to applying a checksum algorithm, function, or procedure which calculates a checksum of a block of data and compares the calculated checksum with an originally encoded checksum which may have been transmitted with and/or stored with the data block. A checksum may refer to any fixed-size data which may be used to identify a data block, such that a difference between the calculated checksum and the original checksum may indicate a difference between the originally stored data and the currently read data. For example, checksum techniques may include parity bytes, modular sums, check sums, etc. The bit-stream 80 may pass the checksum test (block 82) if the calculated checksum matches the encoded checksum, and may fail the checksum test (block 82) if the calculated checksum does not match the encoded checksum. In some embodiments, any suitable processor 28 may control a checksum test by transmitting a bit-stream through the checksum circuitry 58 and determining whether the bit-stream passes or fails the checksum test.

If the process 70 determines (block 84) that the bit-stream 76 passes the checksum test (block 82), the bit-stream 76 may be output (block 86) without further decoding. As the data may have been recorded utilizing a read-after-write (RAW) verification technique, the data may already be sufficiently accurate. Thus, as will be appreciated, the bit-stream 76 may typically pass the checksum test (block 82). In some embodiments, outputting the bit-stream 76 may involve further processing.

If the process determines (block 84) that the bit-stream 76 does not pass the checksum test (block 82), the buffered bit stream 80 may be decoded (block 88). For example, the buffered bit stream 80 may be transmitted from the checksum circuitry 58 to the decoder 60 in the optical reader system 10 of FIG. 1. Decoding of data generally may not occur unless a data block does not pass the checksum test (block 82). If the data block passes the checksum test, the buffered bit-stream 80 may not need to be decoded (block 88), as indicated by the dotted path which provides the buffered bit-stream 80 to the decoding process (block 88). As discussed, the selective decoding of data likely to be inaccurate may improve the efficiency of the decoding system, as energy which may otherwise be utilized to perform unnecessary decoding processes on data likely to be accurate may be conserved.

Decoding (block 88) the buffered bit-stream 80 may involve removing any redundant bits from the bit-stream 80 and/or error correcting the buffered bit-stream 80. For example, redundant bits in the bit-stream may correspond to a number of different error correction codes (ECC), including, for example, Reed-Solomon encoding, feed-forward systematic codes, recursive systematic codes, Viterbi codes, bit-error rate minimizing code, etc. The redundant bits may then be used to correct errors which may have occurred during the reading process. A corrected bit-stream 90 may result from the decoding (block 88), and the checksum algorithm (block 92) would be applied to the corrected bit-stream 90. While the checksum algorithms (block 82 and 92) may be numbered differently in this flow chart, it should be noted that the checksum algorithms may be substantially the same, and may be numbered differently only to differentiate between the different bit-streams on which a common checksum test is being applied. The process 70 may again determine (block 94) whether the corrected bit-stream 90 passes the checksum test (block 92). If the corrected bit-stream 90 passes the checksum test (block 92), the results may be output (block 86).

If the corrected bit-stream 90 does not pass the second checksum test (block 92), in some embodiments, the failed data block may be read again (block 72) to produce an additional bit-stream 96 of the same data block. A checksum test may also be applied to the additional bit-stream 96, and as with the originally read bit-stream 76, the additional bit-stream 96 may be decoded if it fails the checksum test or output if it passes the checksum test. In some embodiments, the process 70 may track the number of reads already completed on the block of data, and if the process 70 determines (block 74) that the current read (block 72) is not the first read, the additional bit-stream 96 may be combined (block 98) with the originally buffered bit-stream to form the combined bit-stream 100. Combining (block 98) the buffered bit-stream 80 with the additional bit-stream 96 may combine the bit predictions based on two readings of the data block, and may have a higher probability of being correct after decoding. The combined bit-stream 100 may be decoded (block 88), and an additional checksum test (block 92) may be applied to the corrected combined bit-stream 90. If the process 70 determines (block 94) that the corrected combined bit-stream 90 now passes the additional checksum test (block 92), the corrected combined bit-stream 90 may be output (block 86). If the corrected combined bit-stream 90 still does not pass the additional checksum test (block 92), in some embodiments, the data block may be read again (block 72).

In some embodiments, the process 70 may recursively read (block 72) a channel to re-read a data block that has not passed the checksum test (block 92), and at each additional read, the current bit-stream 96 may be combined (block 98) with the buffered bit-stream 80 for decoding (block 88). In one embodiment, each combined bit-stream 100 produced during one iteration of the process 70 may also be buffered to be used for combination (block 98) in future iterations of the process. Further, in some embodiments, the process 70 may limit the number of reads for any given data block. For example, the processor 28 (FIG. 1) may control the process 70 and track the number of readings of each data block, and may stop the process 70 for a data block after a certain threshold (e.g., 4 readings).

As will be appreciated, the majority of data recorded using RAW verification may be highly likely to be correct, and may pass the first checksum test (block 82). When data passes the first checksum test (block 82), the data does not need further decoding (block 88), and a decoder 60 of the system 10 (FIG. 1) need not be activated. In some embodiments, a decoder 60 may be activated (e.g., via a control signal 62 from the processor 28) in the event of a checksum failure, to further error-correct the failed data. However, the default deactivated status of the decoder 60 may provide substantial energy conservation and heat reduction for the system 10.

Furthermore, as a decoder 60 may not be constantly activated in one or more embodiments, one decoder 60 may be used for multi-channel reader systems. For example typical reader systems may use one decoder for each channel that is concurrently read, as data is typically always decoded during and/or immediately after reading. Such a system may result in not only high energy consumption and heat generation, but also increased complexity, as additional decoders and circuitry must be used to implement a decoder for the multiple channel readers. In some embodiments, using one decoder 60 for multiple channel readers may result in reduced energy consumption and reduced system complexity.

Figure 3:
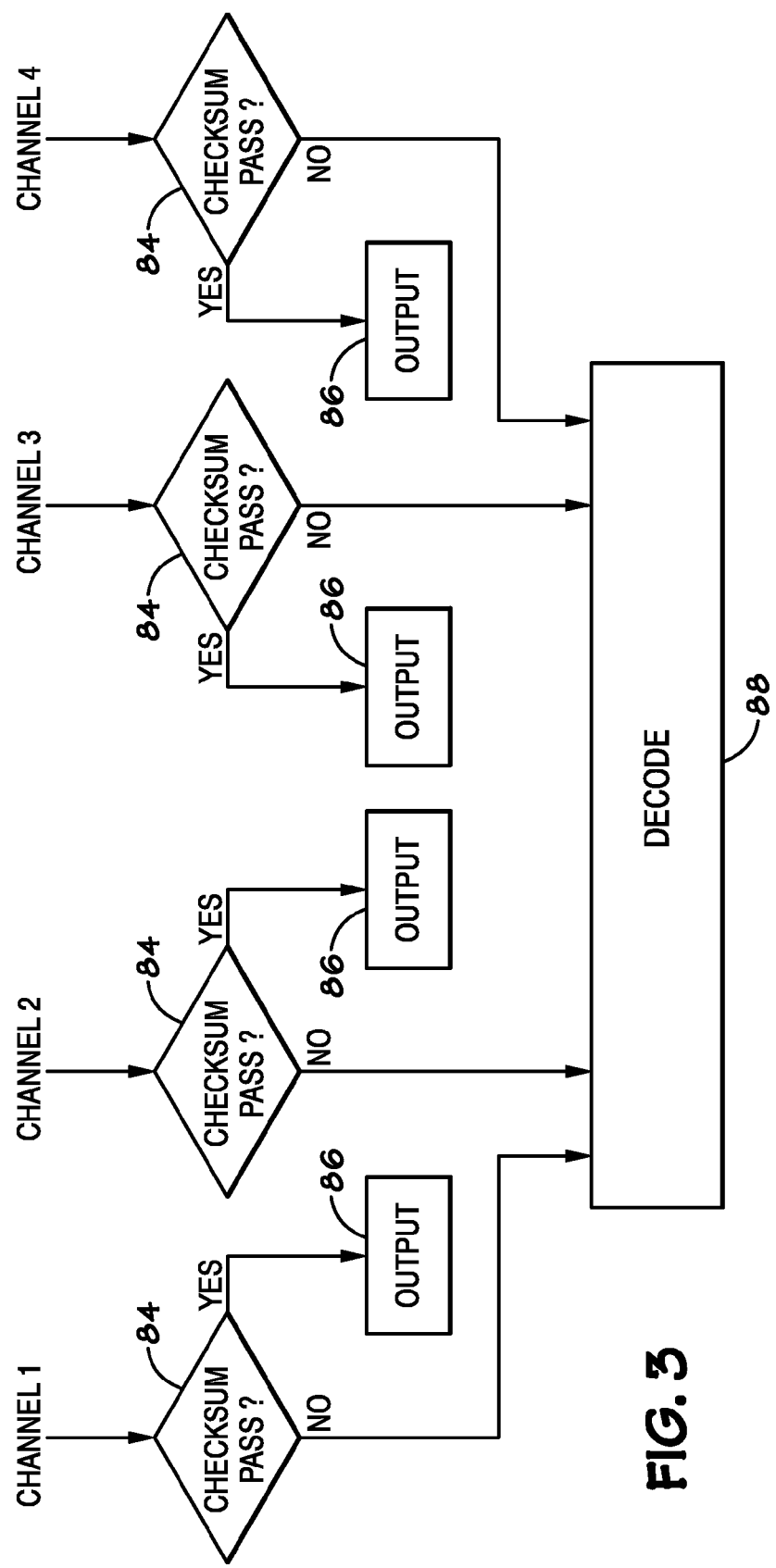
FIG. 3 is a flow chart illustrating a process of reading multiple channels using a common decoder, in accordance with an embodiment.

A block diagram depicting four concurrent channel readings and using one common decoder is provided in FIG. 3. As discussed, the majority of RAW verified data may be correct, and may pass the checksum test to be output (block 86). Thus, the data may not require further decoding (block 88). Since data on one channel may be transmitted for output (block 86) more often than transmitted for decoding (block 88), the decoder 60 may be efficiently shared by more than one channel reader. For example, in the embodiment illustrated in FIG. 3, a multi-channel reader may read four channels, and each of the four channels may use a common decoder 60 for decoding (block 88) in the generally rare event of a checksum failure. In some embodiments, a processor may control a multiplexer to select the decoding (block 88) of a particular channel which may have failed a checksum test.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical reader system, comprising:
   one or more optical elements configured to detect a reflection of a read beam transmitted toward a micro-hologram of an optical medium;
   optical reading circuitry configured to produce a first data stream based on the reflection of the read beam from the optical medium;
   checksum circuitry configured to apply a checksum test to the first data stream;
   a processor configured to determine whether the first data stream passes the checksum test; and
   a decoder configured to be deactivated when the processor determines that the first data stream passes the checksum test, and configured to be activated when the processor determines that the first data stream fails the checksum test.

2. The system of claim 1, comprising a memory system accessible to the checksum circuitry, wherein the memory system is configured to store a checksum algorithm of the checksum test.

3. The system of claim 1, wherein the processor is configured to deactivate or activate the decoder via a control signal.

4. The system of claim 1, comprising a buffer coupled to the optical reading circuitry and the decoder, wherein the buffer is configured to buffer the first data stream produced by the optical reading circuitry, and wherein the decoder is configured to access the buffer, decode the buffered first data stream, and produce an error-corrected first data stream.

5. The system of claim 4, wherein the checksum circuitry is configured to apply the checksum test to the error-corrected first data stream, and wherein the processor is configured to determine whether the error-corrected first data stream passes the checksum test.

6. The system of claim 5, wherein the processor is configured to control a second optical data reading from the optical medium when the processor determines that the error-corrected first data stream fails the checksum test, and wherein the optical reading circuitry is configured to produce a second data stream based on the second optical reading.

7. The system of claim 1, wherein the processor is configured to control a second optical data reading from the optical medium, and wherein the optical reading circuitry is configured to produce a second data stream based on the second optical reading.

8. The system of claim 7, wherein the processor is configured to:
   combine the first data stream with the second data stream to produce a combined data stream;
   transmit the combined data stream to the decoder to produce an error-corrected combined data stream; and
   transmit the error-corrected combined data stream to the checksum circuitry to apply the checksum test to the error-corrected combined data stream.

9. The system of claim 8, wherein the processor is configured to:
   determine whether the error-corrected combined data stream passes the checksum test; and
   output the error-corrected combined data stream if the processor determines that the error-corrected combined data stream passes the checksum test.

10. The system of claim 8, wherein the processor is configured to:
    determine whether the error-corrected combined data stream passes the checksum test;
    control a third optical data reading from the optical medium if the processor determines that the error-corrected combined data stream fails the checksum test, wherein the optical reading circuitry is configured to produce a third data stream based on the third optical reading; and
    combine the third data stream with one or more of the first data stream, the second data stream, the combined data stream, and the error-corrected combined data stream.

11. The system of claim 1, wherein the optical reader system is configured to read multiple channels of optical data concurrently to produce multiple data streams, and wherein the decoder is configured to be activated to decode one of the multiple data streams at one time.

12. The system of claim 1, wherein the optical reader system is configured to read multiple channels of optical data concurrently, and wherein the checksum circuitry configured to apply the checksum test to multiple data streams in parallel, wherein each of the multiple data streams correspond to one of the multiple channels of optical data.

13. A method comprising:
    detecting a reflection of a read beam transmitted toward an optical storage medium, wherein the reflection of the read beam comprises a first data block from a micro-hologram stored on the optical storage medium;
    generating a first bit-stream based on the first data block;
    buffering the first bit-stream;
    applying a checksum test to the first bit-stream; and
    deactivating a decoder if the first bit-stream passes the checksum test.

14. The method of claim 13, comprising:
    activating the decoder if the first bit-stream fails the checksum test;
    decoding the buffered first bit-stream if the first bit-stream fails the checksum test, wherein decoding the buffered first bit stream produces a corrected first bit-stream;
    applying the checksum test on the corrected first bit-stream; and
    outputting the corrected first bit-stream if the corrected first bit-stream passes the checksum test.

15. The method of claim 14, comprising:
    reading a second data block from the optical storage medium if the corrected first bit-stream fails the checksum test;
    generating a second bit-stream based on the second data block;
    combining the second bit-stream with the buffered first bit-stream to produce a combined bit-stream; and
    decoding the combined bit-stream to produce a corrected combined bit-stream.

16. The method of claim 15, comprising:
    applying the checksum test on the corrected combined bit-stream; and
    outputting the corrected combined bit-stream if the corrected combined bit-stream passes the checksum test.

17. The method of claim 13, wherein applying the checksum test comprises:
    calculating a checksum of the first bit-stream;
    comparing the calculated checksum with an encoded checksum of the first bit-stream;
    determining that the first bit-stream passes the checksum test if the calculated checksum matches the encoded checksum; and
    determining that the first bit-stream fails the checksum test if the calculated checksum does not match the encoded checksum.

18. A method of decoding for a multiple-channel optical reader, the method comprising:
    detecting reflections of a plurality of micro-holograms from respective multiple optical data channels of an optical storage medium, wherein the reflections comprise respective multiple data blocks;
    generating multiple data streams based on the multiple data blocks;
    performing a checksum test on each of the multiple data streams; and
    utilizing a common decoder for each of the multiple data streams.

19. The method of claim 18, wherein utilizing the common decoder for each of the multiple data stream comprises:
    maintaining the common decoder in a deactivated state unless any of the multiple data streams fail the checksum test; and
    activating the common decoder if any of the multiple data streams fail the checksum test.

20. The method of claim 18, wherein utilizing the common decoder for each of the multiple data stream comprises:
    activating the common decoder only when any of the multiple data streams fail the checksum test; and
    decoding one of the multiple data streams that has failed the checksum test.

* * * * *